No. 864,903. PATENTED SEPT. 3, 1907.
A. J. MORSE.
TRANSMISSION GEAR.
APPLICATION FILED DEC. 6, 1905.

WITNESSES:
Frank O'Brien
W. H. Pumphrey

INVENTOR
Arthur J. Morse
BY
Geo. H. Benjamin
ATTORNEY

UNITED STATES PATENT OFFICE.

ARTHUR JACOB MORSE, OF TORRINGTON, CONNECTICUT, ASSIGNOR OF ONE-HALF TO ADELBERT P. HINE, OF TORRINGTON, CONNECTICUT.

TRANSMISSION-GEAR.

No. 864,903.

Specification of Letters Patent.

Patented Sept. 3, 1907.

Application filed December 6, 1905. Serial No. 290,622.

*To all whom it may concern:*

Be it known that I, ARTHUR JACOB MORSE, a citizen of the United States, residing at Torrington, county of Litchfield, State of Connecticut, have invented certain new and useful Improvements in Transmission-Gear, of which the following is a specification.

My invention relates to transmission gearing, and as herein embodied, is designed to provide for the complete control of the speed of a driven shaft or other rotating element connected to receive motion from a driving shaft rotating continuously at a uniform maximum speed.

The invention is particularly adapted for use in motor vehicles, as it permits perfect regulation of the power transmitted without varying the speed of the motor.

The various important features of my invention and the resulting advantages will be hereinafter referred to.

In the accompanying drawings I have illustrated mechanism suitable for carrying my invention into effect.

Figure 1:
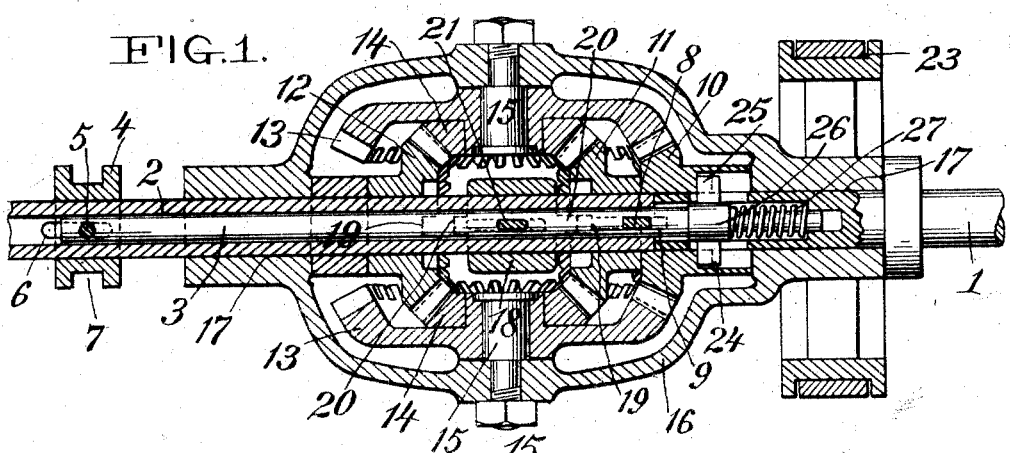
Figure 2:
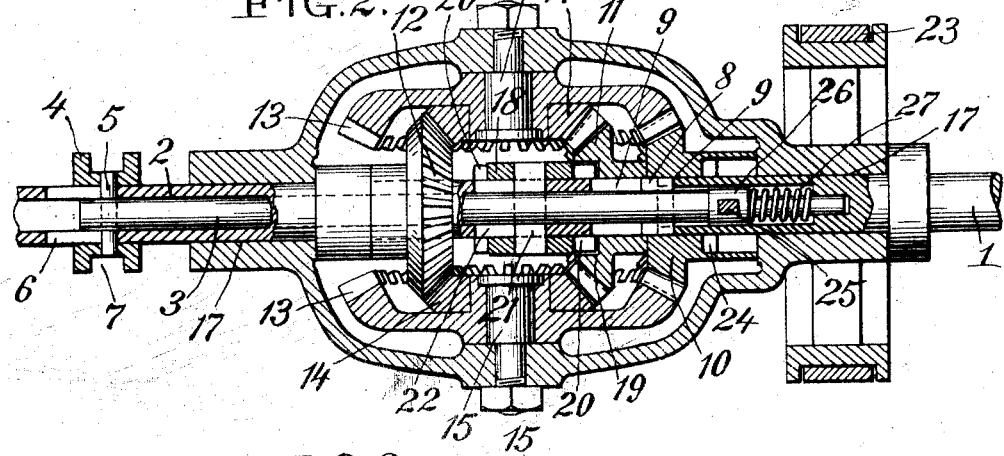
Figure 3:
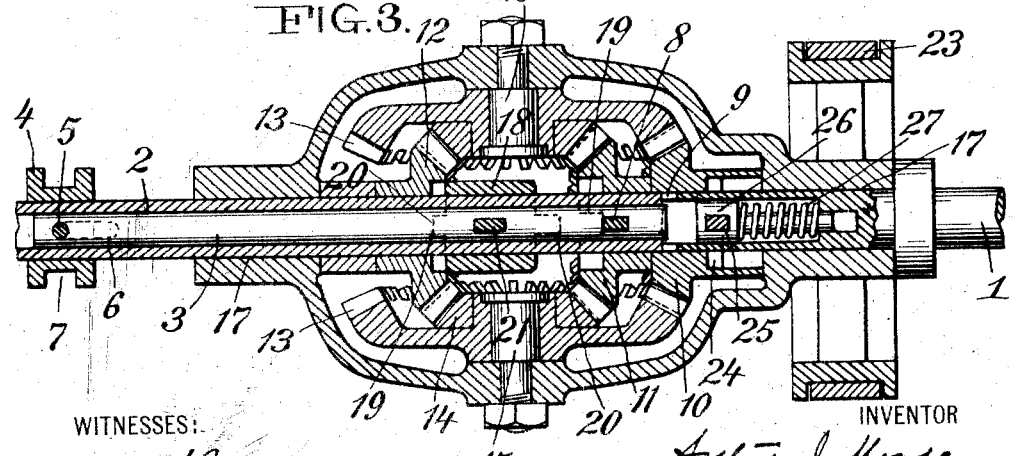

Figure 1, is a longitudinal section showing the gearing adjusted for transmission of power from the driving shaft to rotate the driven shaft in the same direction at a speed reduction of two to one. Fig. 2, is a similar view showing the shafts coupled direct for high speed transmission, and Fig. 3, shows a further adjustment to reverse the direction of rotation of the driven shaft, the speed reduction being two to one, as in Fig. 1.

In the gearing shown, provision is made for rotating the driving and the driven shafts either independently or in coupled relation, in the same direction or in opposite directions, and at the same speed or at different speeds, as desired. The speed of rotation of the driving shaft, in the present embodiment of the invention, is the highest speed transmitted, and when, therefore, the driven shaft is to be rotated at such speed, it is coupled direct. For the transmission of any speed below that of the driving shaft, reducing gears are employed. This particular arrangement is designed to serve for purposes of illustration only, as it will be obvious from the following description that multiplying or other gears may be substituted for the reducing gears without departing from the principle of operation involved.

Referring now to the drawings: 1 represents the driving shaft, and 2, the driven shaft. These shafts, mounted in any approved manner, are arranged end to end and bored out to receive a rod, 3, which is movable back and forth by means of a sliding collar, 4, upon the driven shaft. The collar is secured to the rod by a pin 5, passing through a slot 6, in the shaft and is grooved, as indicated at 7, to coöperate with a yoked lever or other device (not shown) by which its movement may be controlled. For the direct coupling of the shafts, the rod carries a cross pin, 8, designed to be moved in and out of locked relation with notches, 9, formed in the abutting ends thereof. In Fig. 1, the cross pin 8 is shown lying wholly within the notched end of the driven shaft and being disconnected, the shafts may be rotated at different speeds, thus permitting transmission from one shaft to the other through the gearing. In Fig. 2, the shafts are shown coupled by the cross pin 8, for direct transmission, the pin being centered relatively to the line of their abutting ends and engaging the registering notches 9 therein. It will thus be seen, that a full movement of the rod 3 toward the right will connect the shafts for high speed transmission, and the reverse movement of the rod will disconnect them, permitting independent rotation thereof.

When the driven shaft is to be rotated in either direction at a lower speed than that of the driving shaft, the transmission, as above stated, is effected through reducing gearing, which I will now describe.

Upon the shaft 1, a gear 10, is mounted, which will hereinafter be termed the driving gear, and loose upon the shaft 2, there are oppositely disposed gears 11 and 12, hereinafter termed the driven gears. These gears 10, 11 and 12, are shown connected by reducing gears 13 and 14, two sets of such gears being preferably employed, as shown, to equalize the strain and give greater strength, but so far as the transmission of power is concerned, one set only is required. The gears 13 and 14 of each set are secured together and turn loosely upon pins or studs 15, projecting inwardly from the gear casing 16. The casing 16, is preferably formed in sections in the usual manner and has terminal bearings 17, upon the shafts, about which it turns freely.

With the parts adjusted as in Fig. 1, rotation of the shaft 1, carrying the driving gear 10, will give motion through the gears 13 and 14, to the driven gears 11 and 12, causing them to turn in opposite directions, at a two to one reduction in speed. In order now that such motion may be transmitted to the driven shaft, 2, a sliding clutch sleeve 18, is mounted thereon between the gears 11 and 12, which latter are notched, recessed, or otherwise formed as indicated at 19, to coöperate with the engaging ends 20, of the sleeve 18. The movement of the clutch sleeve is controlled by the rod 3, which is connected with the same by a pin 21, projecting through a slot 22, in the shaft 2.

In Fig. 1, the clutch sleeve 18, is shifted far enough toward the right to establish a driving connection between the gear 11 and the driven shaft 2, and transmission from the driving shaft is therefore through gears 10, 13, 14 and 11, causing the shaft 2 to rotate in the same direction as shaft 1, but at half the speed. To reverse the direction of rotation of the shaft 2, without change in the speed, the rod 3 is shifted toward the left, moving the clutch sleeve 18 from the position shown in Fig. 1 to that shown in Fig. 3, to disengage it from the gear 11, which thereafter turns loosely upon the shaft and cause it to interlock with the gear 12. When thus adjusted, transmission from the driving shaft to the driven shaft is through gears 10, 14, 13 and 12.

With the gearing adjusted as in Figs. 1 or 3, for a two to one drive, any load upon the driven shaft in excess of the total resistance offered by the weight and friction of the engaging parts of the gearing will cause the casing and reducing gears 13 and 14 carried thereby to revolve about the driven gears 11 and 12 and the driven shaft will cease to rotate. In order, therefore, to counterbalance the load, a friction band brake 23, or other suitable friction device is employed in connection with the casing and as will be seen, by varying this friction, a corresponding variation will follow in the power transmitted, permitting the driving shaft to be run continuously in one direction at full speed, while the driven shaft, when rotating in the same or in the opposite direction, may be caused to make any number of revolutions up to the maximum number for which it is geared.

Referring now to Fig. 2, when the shafts, as shown, are coupled direct for the transmission of high speed, it is desirable that the driving gear 10, should run free, as otherwise the entire mechanism would rotate as a unit. This would follow, as will be evident, since the gear 11, connected through the clutch 18 with the shaft 2, can not rotate at the speed of the gear 10 upon the shaft 1, and hence, the entire train would be locked. For the purpose, therefore, of causing the gear 10 to become disconnected from the driving shaft at such times, it is notched as indicated at 24, to receive a key 25, which is carried by a pin 26, spring-seated in the socketed end of the driving shaft. As arranged, the spring 27, advances the key into locked relation with the gear and the disengagement thereof is effected by the rod 3, when shifted to the limit of its movement toward the right. With the gear 10, running free and the friction 23 applied, the entire train driven by the gear 11 will turn idly as the transmission is direct through the shafts. A further adjustment not shown, results from shifting the rod 3, from the position shown in Fig. 1, far enough toward the left to center the clutch sleeve relatively to the gears 11 and 12, in which position the shaft 2, is entirely disconnected and ceases to rotate.

It will be observed that the various adjustments above described are made without moving the gears in and out of engagement; also that the speed and direction of rotation of the driven shaft is under complete control and may be varied gradually or suddenly as required.

Having thus described my invention, I claim:

1. A power transmitter comprising a driving member, a driven member, gearing connecting the members and arranged in a train having selective branches, said gearing including planetary gears common to both branches, and means for retarding in varying degree the motion of the planetary gears in their orbit about the other gears of the train to vary the speed of rotation of the driven member.

2. A power transmitter comprising a driving member, a driven member, gearing connecting the members and arranged in a main train having selective branches, said gearing being permanently mounted in intermeshing relation, said gearing including planetary gears common to both branches, and means for retarding in varying degree the motion of the planetary gears in their orbit about the other gears of the train to vary the speed of rotation of the driven member.

3. A power transmitter comprising a driving member, a driven member, permanently-meshed gearing connecting the members and arranged in a train having operatively selective branches, and means independent of the driving member and common to the several branches for varying the power transmitted.

4. A power transmitter comprising a driving member rotating continuously at maximum speed, a driven member, permanently-meshed gearing connecting the members and arranged in a train having operatively selective branches, and means for varying the effective speed of rotation of certain gears common to both branches.

5. A power transmitter comprising a driving member, a driven member, gearing connecting said members arranged in a main train having two branches, said branches being inversely operable to rotate said driven member in either direction, and said main train including gears movable in planetary relation to the gears with which they intermesh, and means for offering varying resistance to the orbital movement of said planetary gears.

6. A power transmitter comprising a driving member, a driven member, gearing arranged in a branched train connecting the members, certain gears of the train and common to both branches being movable in planetary relation to the gears with which they intermesh, and means common to the several planetary gears to control the planetary movement thereof.

7. A power transmitter comprising a driving member, a driven member, permanently-meshed gearing arranged in a branched train connecting said members and having a driving gear and planetary gears common to both branches, and means for varying the effective speed of rotation of said planetary gears.

8. A power transmitter comprising a driving member, a driven member, and interposed gearing arranged in a single train terminating in selective branches to transmit motion from the driving member to rotate the driven member in either direction, said gearing including planetary members the effective speed of rotation of which is variable.

9. A power transmitter comprising a driving member, a driven member, means for directly connecting said members, a single train of gears terminating in selective branches for transmitting motion from the driving member to rotate the driven member in either direction, said train including planetary gears the effective speed of rotation of which is variable.

10. A power transmitter comprising a driving member, a driven member, means for directly connecting said members, and a single train of gears terminating in selective branches for transmitting motion from the driving member to rotate the driven member in either direction, said train including reducing gears the effective speed of rotation of which is variable.

11. A power transmitter comprising a driving member, a driven member, a gear loosely mounted upon each of the members, clutches coöperating therewith, interposed gears meshing with the gears upon the driving and driven members and movable in planetary relation thereto, and means for varying the effective speed of rotation of said interposed gears.

12. A power transmitter comprising a driving member, a driven member, a gear loosely mounted upon the driving member, oppositely disposed gears loosely mounted upon the driven member, coöperating clutches, interposed gears meshing with the gears carried by said members and movable in planetary relation thereto, and means for varying the effective speed of rotation of said interposed gears.

13. A power transmitter comprising a driving member, a driven member, a gear loosely mounted upon the driving member, oppositely disposed gears loosely mounted upon the driven member, a clutch controlling each of said gears, reducing gears meshing with the gears carried by said members and movable in planetary relation thereto, and means for varying the effective speed of rotation of said reducing gears.

14. A power transmitter comprising a driving member, a driven member, a train of gears connecting the members, the terminal gears of said train being loosely mounted upon said members, requisite clutches controlling said terminal gears, and means for varying the effective speed of rotation of the intermediate gears during transmission of power through the train.

15. A power transmitter comprising a driving member, a driven member, a train of gears connecting the members, the terminal gears of the train being mounted upon said members, requisite clutch mechanism coöperating with the terminal gears, and controlling means by which the intermediate gears may be given a variable speed of rotation during transmission of power through the train.

16. A power transmitter comprising a driving member, a driven member, a train of transmission gearing for rotating the members in the same direction or in opposite directions, clutches coöperating with the gearing, a single controlling device common to the clutches, and means for varying the effective speed of rotation of certain gears of the train during transmission.

17. A power transmitter comprising a driving member, a driven member, a train of reducing gears connecting the members, the terminal gears of the train being mounted upon said members and the intermediate gears movable in planetary relation thereto, and means for varying the effective speed of rotation of said intermediate gears.

18. A power transmitter comprising a driving member, a driven member, a train of reducing gears connecting the members, the terminal gears of the train being loosely mounted upon said members and the intermediate gears movable in planetary relation thereto, requisite clutches coöperating with the terminal gears, and means for varying the effective speed of rotation of the intermediate gears.

19. A power transmitter comprising a driving member, a tubular driven member, a train of gears connecting the members and arranged in permanent intermeshing relation, coöperating clutches controlling the direction and speed of rotation of the driven member, and an operating device within the driven member common to the several clutches.

20. A power transmitter comprising a driving member, a driven member, gearing connecting the members arranged in a branched train driven from a common gear upon the driving member and each branch terminating in a gear upon the driven member, a clutch co-acting with the several terminal gears upon the driven member, and means independent of the clutch for varying the effective speed of rotation of the intermediate gears common to the several branches of the train.

21. A power transmitter comprising a driving member, an independently rotatable driven member, a clutch controlling direct connection between the members, gearing connecting the members for the transmission of power from one to the other and arranged in a branched train, both branches having a common driving gear and common intermediate gears, and controlling means co-acting with said intermediate gears for varying the speed of the driven member.

22. A power transmitter comprising a driving member, a gear mounted thereon, a driven member, oppositely disposed gears mounted upon the driven member, a clutch coöperating with each of said gears, reducing gears interposed between and connecting the gears upon the driving and driven members and movable in planetary relation to the same, and a variable friction device controlling the planetary movement of the reducing gears.

23. A power transmitter comprising a driving member, a gear mounted thereon, a driven member, oppositely disposed gears mounted upon the driven member, a clutch coöperating with each of said gears, twin sets of reducing gears interposed between and connecting the gears upon the driving and driven members and movable in planetary relation to the same, a rotatable casing in which said reducing gears are mounted, and a friction brake controlling the movement of the casing.

24. A tubular driving member, a gear mounted thereon, a tubular driven member, oppositely disposed gears mounted upon the driven member, a clutch coöperating with each of said gears, a sliding rod within said tubular members controlling the clutches, twin sets of reducing gears interposed between and connecting the gears upon the driving and driven members and movable in planetary relation to the same, a rotatable oil tight casing in which said reducing gears are mounted, and a friction brake co-acting with the casing.

25. A power transmitter comprising a driving member, a driven member, a plurality of gears interposed between the members, a selective clutch device controlling direct transmission from one member to the other and indirect transmission through the gears, and means for varying the speed of the gears.

26. A power transmitter comprising a driving member, a driven member, a plurality of gears interposed between the members, a selective clutch device controlling direct transmission from one member to the other and indirect transmission through the several gears, and means independent of the driving member for varying the speed of the gears.

27. A power transmitter comprising a driving member, a driven member, gears interposed between the members and permanently arranged in intermeshing relation, a selective clutch device controlling direct transmission from one member to the other and indirect transmission through the gears, and means independent of the driving member for varying the speed of the gears.

28. A power transmitter comprising a driving member, a driven member, a train of gears interposed between the members comprising a planetary gear, a selective clutch device controlling direct transmission from one member to the other and indirect transmission through the train, and means for varying the effective speed of rotation of the planetary gear.

29. A power transmitter comprising a driving member, a driven member, a train of gears interposed between the members, said train comprising a planetary gear, a clutch device controlling direct transmission from one member to the other and indirect transmission through the train, and means for varying the effective speed of rotation of the planetary gear.

In testimony whereof, I affix my signature, in the presence of two witnesses.

ARTHUR JACOB MORSE.

Witnesses:
W. H. PUMPHREY,
CHARLES D. GREEN.